United States Patent [19]
Daly et al.

[11] Patent Number: 5,930,362
[45] Date of Patent: Jul. 27, 1999

[54] GENERATION OF ENCRYPTION KEY

[75] Inventors: Brian Kevin Daly, Redmond; Leslie Dale Owens, Issaquah, both of Wash.

[73] Assignee: AT&T Wireless Services Inc, Kirkland, Wash.

[21] Appl. No.: 08/731,105

[22] Filed: Oct. 9, 1996

[51] Int. Cl.$^6$ .................................................. H04L 9/00
[52] U.S. Cl. ............................................. 380/21; 380/30
[58] Field of Search ................................. 380/30, 21, 23, 380/25

[56] References Cited

U.S. PATENT DOCUMENTS

| | | |
|---|---|---|
| 4,218,582 | 8/1980 | Hellman et al. . |
| 4,405,829 | 9/1983 | Rivest et al. . |
| 5,204,902 | 4/1993 | Reeds, III et al. . |
| 5,371,794 | 12/1994 | Diffie et al. . |
| 5,513,245 | 4/1996 | Mizikovsky et al. . |
| 5,568,554 | 10/1996 | Eastlake ..................................... 380/25 |
| 5,668,878 | 9/1997 | Brands ........................................ 380/30 |
| 5,717,759 | 2/1998 | Micali ......................................... 380/30 |

FOREIGN PATENT DOCUMENTS

WO 96/28913   9/1996   WIPO .............................. H04K 1/00

OTHER PUBLICATIONS

M. J. Beller and Y. Yacobi, "Batch Diffie–Hellman Key Agreement Systems and their Application to Portable Communications," *Advances in Cryptology—Eurocrypt '92. Workshop on the Theory and Applications of Cryptographic Techniques*. Proceedings, Balatonfured, Hungary, May 24–28, 1992, ISBN 3–540–56413–6, 1993, Berlin, Germany, Springer–Verlag, Germany, pp. 208–220.

T. Matsumoto, Y. Takashima and H. Imai, "On Seeking Smart Public–Key–Distribution Systems," *The Transactions of the Institute of Electronics and Communication Engineers of Japan*, vol. E69, No. 2, Feb. 1986, pp. 99–106.

Y. Frankel, A. Herzberg, P. A. Karger, H. Krawczyk, C. A. Kunzinger and M. Yung, "Security Issues in a CDPD Wireless Network," *IEEE Personal Communications*, vol. 2, No. 4, Aug. 1995, pp. 16–27.

"New Directions in Cryptography" by Whitfield Diffie and Martin E. Hellman, IEEE Transactions on Information Theory, vol. IT–22, No. 6, Nov. 1976.

*Primary Examiner*—Salvatore Cangialosi
*Attorney, Agent, or Firm*—Samuel H. Dworetsky

[57] ABSTRACT

A set of Diffie-Hellman data encryption values is generated prior to receiving a request for the data encryption values. The data encryption values are then stored in a database. The generating and storing steps are performed repeatedly thus creating a stored table of data encryption values in the database. When a new user calls to activate a mobile station, a cellular network can select from among precalculated Diffie-Hellman data encryption values immediately transmit the values to the mobile station.

14 Claims, 4 Drawing Sheets

GENERATION OF ENCRYPTION KEY

FIELD OF THE INVENTION

The invention relates to data encryption technology and specifically to a process for generating data encryption values used in the activation of a new mobile station on a cellular network.

BACKGROUND OF THE INVENTION

Systems for activating new users on cellular telephones or mobile stations to a cellular network have been in use for some time. The activation process includes storing customer billing information on the cellular network, and storing shared secret data on both the mobile station and the cellular network. The shared secret data includes a telephone number of the mobile station, information for identifying the manufacturer and serial number of the mobile station, and an authentication key (A-key) used to encrypt data sent between the mobile station and the cellular network. Encrypted data may include both voice and data.

The presence of shared secret data on a mobile station and a cellular network allows sophisticated bi-directional verification techniques to be implemented for authentication of the mobile station to the cellular network in subsequent uses. The bi-directional verification techniques aid in limiting practices of Radio Frequency (RF) ease-dropping for the purpose of gaining unauthorized access to the cellular network with charges being fraudulently billed to an authorized subscriber.

A well-known method for activating a mobile station to a cellular network is over-the-air activation teleservice (OATS) and is described in the Telecommunication Industries Association (TIA) standard document number: IS 136. OATS uses a secure method to generate an A-key in both a mobile station and a cellular network known as the Diffie-Hellman method.

The OATS process commences with a telephone call from a user at a mobile station to a customer service representative for a cellular network. In response to the call from the user, an authentication center at the cellular network begins to generate Diffie-Hellman data encryption values. The data encryption values take several minutes to generate due to rigorous statistical requirements, while the user remains on the phone with a customer service representative. Waiting for the generation of Diffie-Hellman data encryption values causes inconvenience to the user and impairs the ability of a cellular network to activate new users.

SUMMARY OF THE INVENTION

The present disclosure provides a method for creating a plurality of Diffie-Hellman data encryption values for subsequent transmission. A set of data encryption values is generated prior to receiving a request for the data encryption values. The data encryption values include at least one value from the group consisting of a public modulus value N, a secret key Y, and a primitive element g. The data encryption values are then stored in a database. The generating and storing steps may be performed repeatedly thus creating a stored table of data encryption values in the database.

This process is used in a cellular network to implement over the air activation. When a new user calls to activate a mobile station, the cellular network can select from among precalculated Diffie-Hellman data encryption values already available and immediately transmit the values to the mobile station. This process greatly reduces the time required for activation, and therefore the burden on the new user and the cellular network provider.

BRIEF DESCRIPTION OF THE DRAWINGS

These and other objects, features, and advantages will become more fully appreciated with reference to the accompanying drawings.

DETAILED DESCRIPTION OF THE INVENTION

Figure 1:
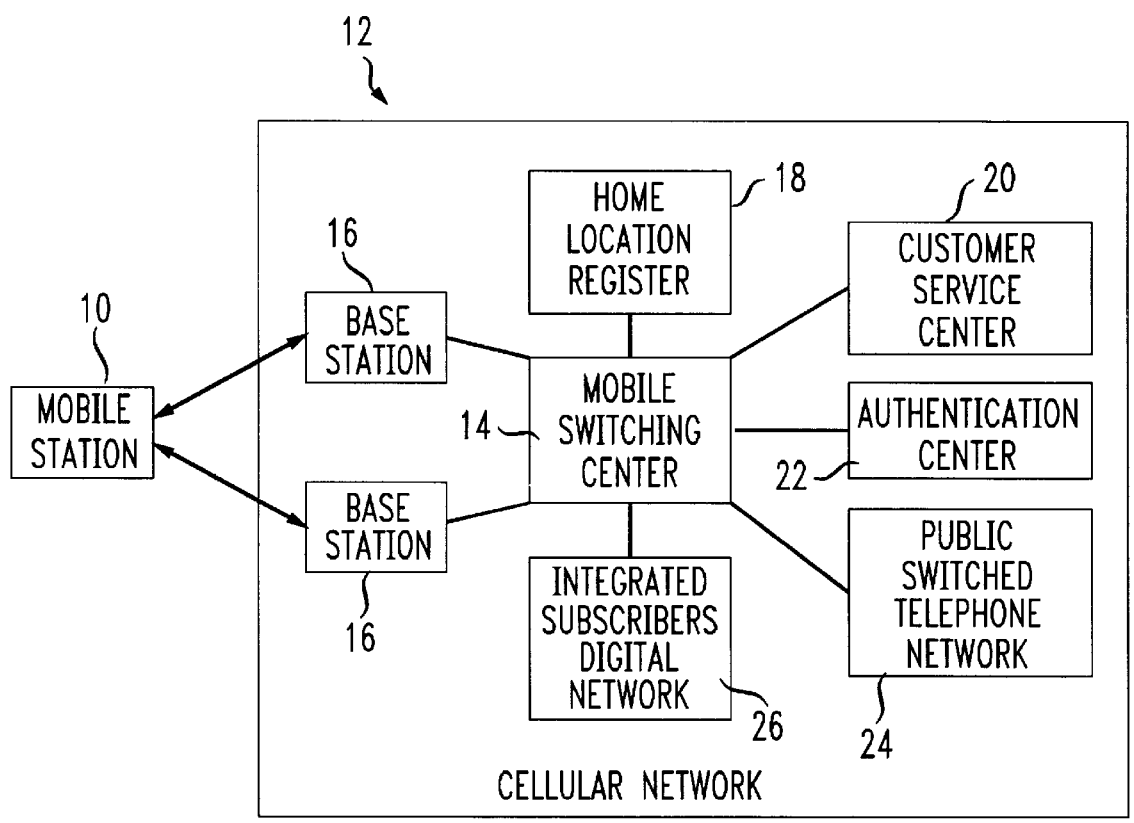
FIG. 1 is a block diagram of a widely known and used cellular network configuration and its interaction with a mobile station.

FIG. 1 depicts a block diagram of a widely known and used cellular network configuration and its interaction with a mobile station 10. A cellular network 12 has a mobile switching center 14, which may be coupled to other mobile switching centers 14 (not shown), and which is also coupled to one or more base stations 16, a home location register 18, a customer service center 20, an authentication center 22, a public switched telephone network (PSTN) 24 and an integrated subscribers digital network (ISDN) 26.

One or more mobile stations 10 interact with the cellular network by transmitting signals to and receiving signals from the base stations 16. When the mobile station 10 is in use, it transmits signals to and receives signals from a current base station 16, typically the base station closest to the mobile station 10. As the mobile station 10 moves away from the current base station 16, the current base station 16 may "hand off" the mobile station 10 to another base station 16 which has become closest to the mobile station 10.

The mobile switching center 14 switches calls originating from and terminating at a mobile station 10 to a variety of other medium including to other mobile switching centers 14, to a PSTN 24, and to an ISDN 26. The home location register 18 identifies a mobile station 10 and indicates the part of the country in which the mobile station 10 is presently or is normally located. The authentication center 22 manages A-keys associated with each mobile station 10 for the purpose encrypting transmissions between each mobile station 10 and the cellular network 12. Furthermore, during activation of the mobile station 10, the authentication center 22 may also generate data encryption values for transmission to a mobile station 10, and process data encryption values received from the mobile station 10 for the purposes of generating an A-key for use in subsequent transmissions.

Figure 2:
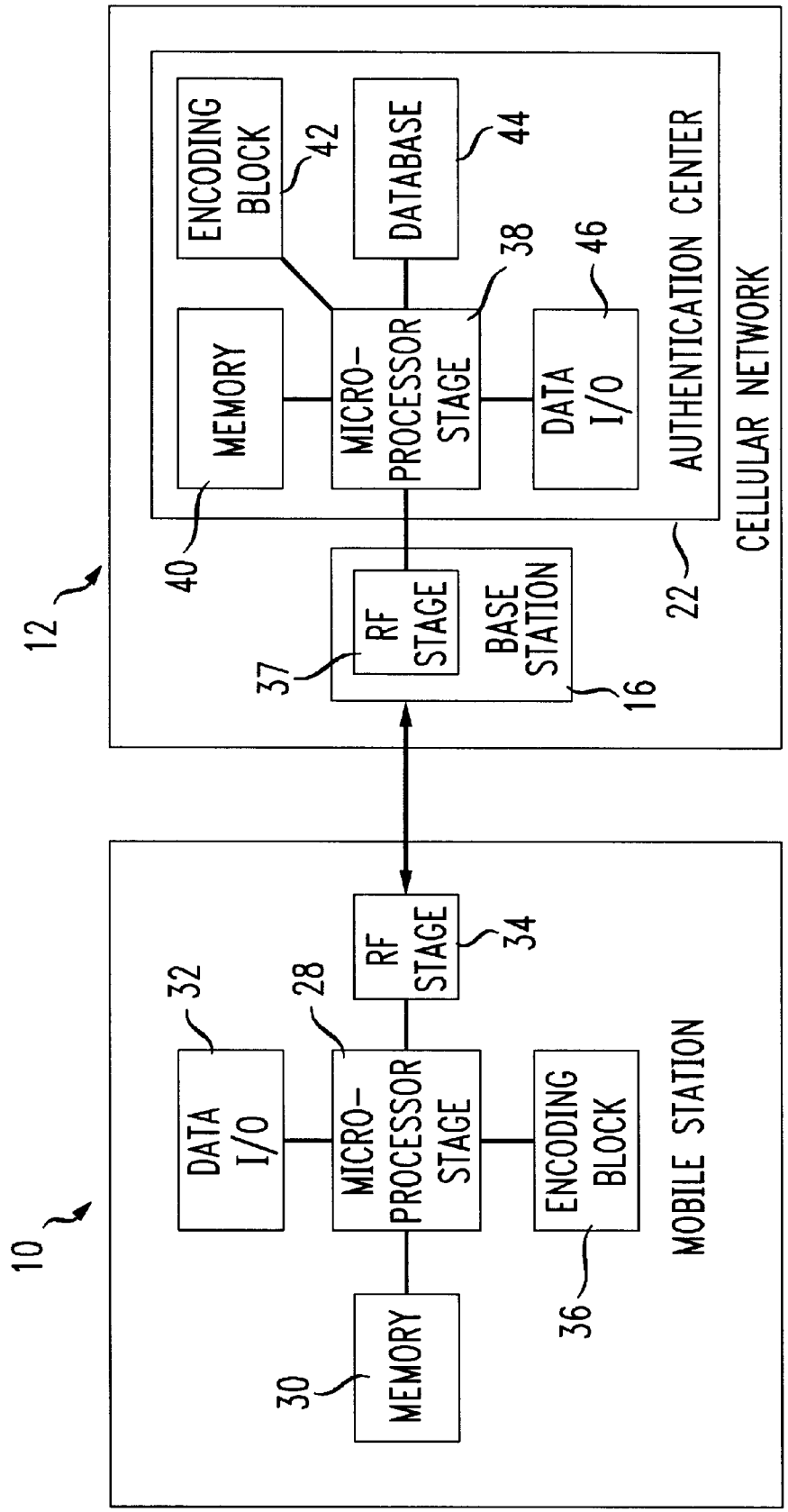
FIG. 2 is a block diagram of an embodiment of a mobile station, a base station, and an authentication center.

FIG. 2 shows a simplified view of a mobile station 10, an authentication center 22, and a base station 16 of the cellular network 12, and illustrates an embodiment used to perform activation of a new mobile station 10. The mobile station 10 has a microprocessor stage 28 coupled to a memory 30, a data input and output (I/O) source 32, a radio frequency (RF) stage 34 and an encoding block 36. The microprocessor stage 28 at the mobile station 10 interacts with the other functional blocks, processes data, and executes software program instructions which enable the mobile station 10 to operate. The microprocessor stage 28 at the mobile station 10 may also generate random numbers and data encryption values used in the activation and data encryption process. The memory 30 may include random access memory (RAM), read only memory (ROM) and programmable read only memory (PROM). The ROM or PROM may be used to permanently store data about the mobile station, including information to identify the manufacturer and serial number of the mobile station, the telephone number of the mobile station, and the A-key of the mobile station. The data input and output source 36 allows the user to place calls, receive messages regarding the transmission of phone calls, as well as to receive and transmit voice and other data. The encoding block 36 performs data encryption. The RF stage 34 transmits data from and receives data for the mobile station 10.

A simplified embodiment of an authentication center 22 is also depicted in FIG. 2. The base station 16 of the cellular network 12 also has an RF stage 37, which receives data from and transmits data to mobile stations 10. The RF stage 37 of the base station 16 is coupled to the authentication center 22, which includes a microprocessor stage 38, a memory 40, an encoding block 42, a database 44, and a data input and output (I/O) source 46. The RF stage 37 may not be directly connected to the authentication center 22, but rather may be coupled to the authentication center 22 through a wired network, another RF stage, through another cellular network component, or any combination thereof.

The microprocessor stage 38 executes program instructions and processes data which enables the authentication center 22 to interact with the other functional blocks and mobile stations 10, and to operate as required by the cellular network 12. The microprocessor stage 38 at the authentication center 22 may also generate Diffie-Hellman data encryption values required for activation of a mobile station 10 on the cellular network 12. The memory 40 is used to store data as required by the microprocessor 38. The encoding block 42 is used for encrypting data sent between the authentication center 22 and the mobile station 10. The database 44 is for storing information used in the process of authenticating and activating subscribers, which may include the telephone number of one or more mobile stations 10, information for identifying the manufacturer and the serial number of the mobile station 10, and the A-key associated with the mobile station 10. The database 44 may also be used to store a table of Diffie-Hellman data encryption values, which values are used in activating a mobile station 10 to a cellular network 12. The data input and output source 46 allows the authentication center 22 to interact with other parts of the cellular network 12 and also allows human interaction with the operation of the authentication center 22.

Figure 3:
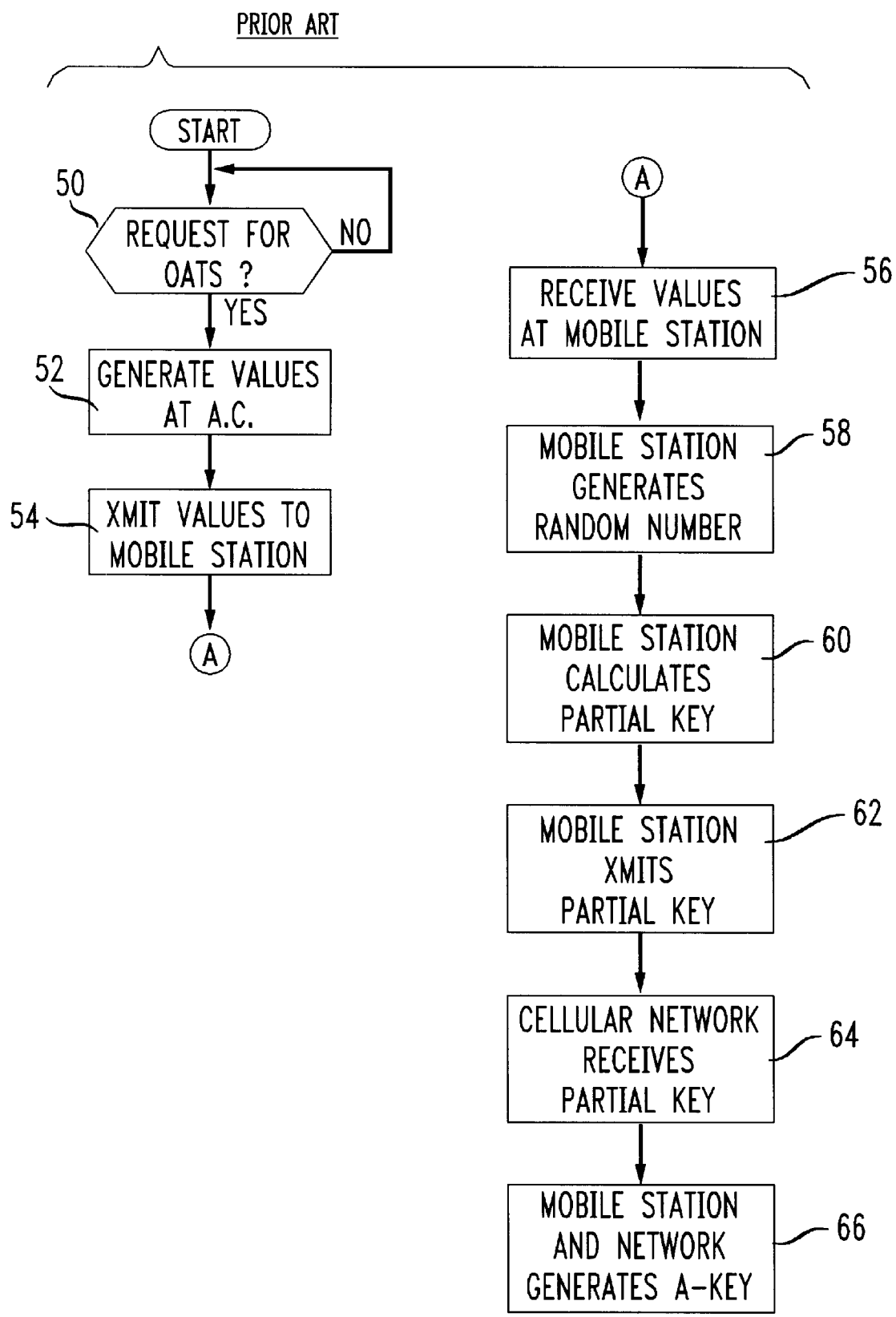
FIG. 3 is a flow diagram of a prior art method of generating Diffie-Hellman encryption parameters for OATS.

FIG. 3 shows a prior art method for activating a mobile station 10 on a cellular network 12 using the Diffie-Hellman method. In step 50, the authentication center 22 waits for a request for activation from a mobile station 10. When a request is received, the microprocessor stage 28 of the authentication center 22 begins to generate Diffie-Hellman data encryption values in step 52.

The generation of Diffie-Hellman data encryption values is time consuming because specific and rigorous rules are followed. In a widely used embodiment, the authentication center 22 must generate a secret key y and a public modulus N, and a primitive element g.

The statistical requirements for the secret key y are that it be a 160-bit random number with the following statistical properties: y shall not be smaller than 4; all values y generated shall have a uniform statistical distribution over their range; all values y generated shall be statistically uncorrelated to the secret key generated for the same or different mobile stations 10; the numbers generated for different secret keys shall not be capable of derivation from the previously used numbers and/or mobile station indicator values; the numbers generated by different authentication centers 22 shall be statistically uncorrelated; and the authentication center 22 shall set the secret key y to the value of this random number.

The public modulus N must be a large prime number. Preferably, the public modulus N is at least a 768-bit prime number, as specified in TIA standard IS-136, with a maximum of 1024 bits, and having the following statistical properties: N shall be different for different mobile stations; all values of N shall have a uniform statistical distribution over their range; all values of N shall be statistically uncorrelated to other values of N for the same or different mobile stations 10; different values for N shall not be capable of derivation from any previously used numbers and/or mobile station indicator values; the numbers generated by different authentication centers 22 shall be statistically uncorrelated; (N−1)/2 should have a large prime factor; and the most significant bit of N should be equal to 1".

After generating the public modulus N, the secret key y, and the primitive element g, the microprocessor 38 must then generate a partial key Y based on the formula:

$$Y = g^y \bmod N \qquad (\text{Eq. \#1})$$

Then, in step 54, the authentication center 22 transmits the public modulus N, the primitive element g, and the partial key Y to the mobile station 10 via the RF stage 37 of the base station 16.

The mobile station 10 receives N, g, and Y in step 56 and in step 58 the mobile station 10 generates a random number using the microprocessor stage 28 which becomes the secret key x. The mobile station 10 then calculates a partial key X in step 60 using the formula:

$$X = g^x \bmod N \qquad (\text{Eq. \#2})$$

The mobile station 10 then transmits in step 62 the value X to the cellular network 12 via the RF stage of the mobile station 10. Then, in step 64 the cellular network 12 receives the partial key X. In step 66, both the mobile station 10 and the authentication center 22 calculate the A-Key based on the formulas below:

$$A\text{-key}_{ms} = (Y)^x \bmod N = (g^y \bmod N)^x = g^{yx} \bmod N \qquad (\text{Eq. \#3})$$

$$A\text{-key}_{AC} = (X)^y \bmod N = (g^x \bmod N)^y = g^{xy} \bmod N \qquad (\text{Eq. \#4})$$

The A-key is then stored on the cellular network 12 and on the mobile station 10 and becomes the basis for encryption in subsequent transmissions between the cellular network 12 and the mobile station 10.

Figure 4:
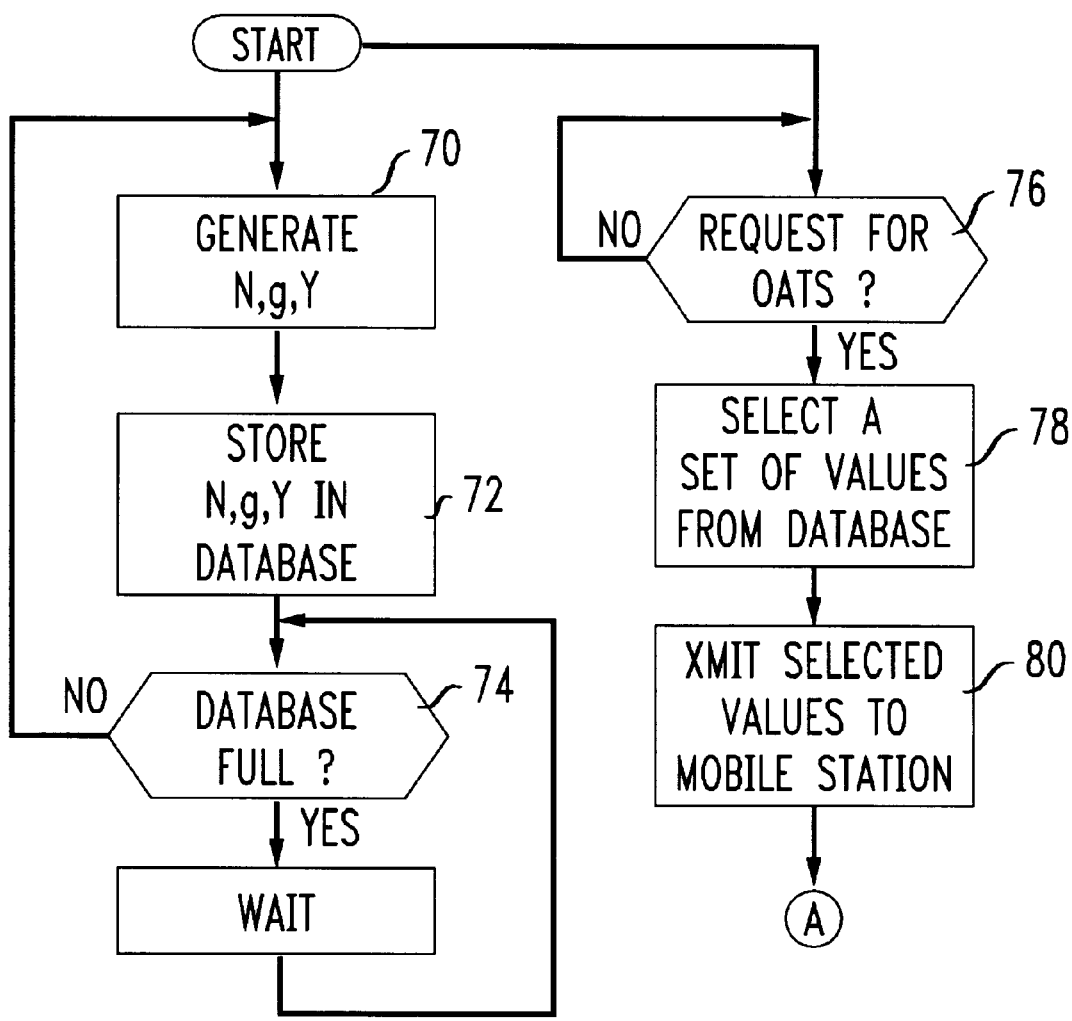
FIG. 4 is a flow diagram of a method of the invention showing independent generation of Diffie-Hellman encryption parameters for OATS.

FIG. 4 illustrates a method of the present invention, which eliminates delay associated with the generation of Diffie-Hellman data encryption values. Rather than waiting for a user at a mobile station 10 to contact the cellular network 12 for activation, in step 70 the microprocessor 38 generates Diffie-Hellman data encryption values including a public modulus N, a primitive element g, and a secret key y. Once N, g, and y have been generated they are stored in the database 44 in step 72 for subsequent retrieval. Then, if the database 44 is full in step 74, or if some other condition as determined by the authentication center is reached, the generation of Diffie-Hellman data encryption values ceases. Otherwise, the method is repeated starting with step 70 in which the microprocessor 38 at the authentication center 22 generates another set of Diffie-Hellman data encryption values. In step 72, these values are stored on the database 44.

In this manner, a table of available sets of Diffie-Hellman data encryption values is stored on the database 44 for subsequent transmission to users at mobile stations 10 during activation. The table of data encryption values may vary depending on the implementation at the authentication center 22. Storing N, g, y, and Y or any combination of one or more of them would be advantageous. In a preferred embodiment of the invention, the table of stored values is as shown below:

$N_1, g_1, Y_1$
$N_2, g_2, Y_2$
$N_3, g_3, Y_3$
$N_4, g_4, Y_4$

In step 76, the authentication center 22 waits for a request for activation from a user. Upon receiving a request for activation in step 76, the authentication center 22 in step 78 selects a value from the database 44 of Diffie-Hellman data encryption values. The sets of Diffie-Hellman data encryption values may be selected randomly from the database, on a first-in first-out (FIFO) basis, or any other arbitrary selection scheme. Thus, the data encryption values are immediately available for use upon request. Then, depending on the Diffie-Hellman values stored in the database 44, the authentication center 22 may have to generate additional values. If N, g, and Y are stored in the database 44, the authentication center 22 does not need to generate any additional values. If N, g, and y are stored, the authentication must first generate Y from equation number 1 given above. If either N, g, or both is not stored, the missing values must be generated. If neither Y nor y is stored, y must be generated and from it Y generated based on equation number 1 above. If y has been stored but not Y, Y must be generated from the stored value y based on equation number 1 above. Then in step 80, the data encryption values N, g, and Y are transmitted to the mobile station as part of generation of the A-key. Subsequently, method steps 56 through 66 shown in FIG. 3 may be performed to accomplish the activation.

Although specific embodiments of the invention have been disclosed, it will be understood by those having skill in the art that changes can be made to those specific embodiments without departing from the spirit and the scope of the invention.

What is claimed is:

1. A process for creating a plurality of Diffie-Hellman data encryption values for subsequent transmission, the process comprising the steps of:
   (a) generating a set of data encryption values, prior to receiving a request for said data encryption values, said set of data encryption values including at least one value from the group consisting of a public modulus value N, a secret key y, and a primitive element g; and
   (b) storing said set of data encryption values in a databases;
   wherein step (a) and step (b) are performed repeatedly, thus creating a stored table of sets of said data encryption values in said database.

2. The process according to claim 1, wherein:
   step (a) further includes the step of calculating a partial key Y based on said public modulus N, said secret key y, and said primitive element g; and
   step (b) includes the step of storing said public modulus N, said primitive element g, and said partial key Y.

3. The process according to claim 1, wherein said database is part of a cellular network.

4. The process according to claim 3, wherein said cellular network transmits data to and receives data from a mobile station, and wherein said process is used in over the air activation of said mobile station.

5. The process according to claim 3, wherein said cellular network transmits data to and receives data from a mobile station, and wherein the process further comprises the steps of:

(c) receiving a request for activation of said mobile station;
   (d) selecting a current set of data encryption values from said database; and
   (e) transmitting said current set of data encryption values from said cellular network to said mobile station.

6. The process according to claim 5,
   further comprising the step of generating a partial key Y based on said current set of data encryption values selected in step (e); and
   wherein step (e) includes the step of transmitting said partial key Y from said cellular network to said mobile station.

7. The process according to claim 5, further comprising the steps of:
   (f) receiving said current set of data encryption values from said cellular network at said mobile station;
   (g) generating a secret value x at said mobile station;
   (h) generating a partial key X based on said secret value x at said mobile station; and
   (i) transmitting said partial key X from said mobile station to said cellular network.

8. The process according to claim 7, further comprising the step of:
   (j) generating an A-key at said mobile station based on said secret key x and said current set of data encryption values.

9. The process according to claim 8, further comprising the steps of:
   (k) receiving said partial key X at said cellular network; and
   (l) generating an A-key at said cellular network based on said partial key x and said current set of data encryption values.

10. The process according to claim 9, further comprising the step of:
    (m) comparing said A-key at said mobile station to said A key at said cellular network.

11. The process according to claim 9, wherein said mobile station includes a memory, and wherein said A-key is stored in said memory in said mobile station and in said database in said cellular network for subsequent authentication of said mobile station to said cellular network.

12. The process according to claim 7, wherein said current set of data encryption values is erased from said database after said mobile station is authenticated to said cellular network.

13. An apparatus for precalculating Diffie Hellman data encryption values, comprising:
    a processor executing software instructions and generating Diffie-Hellman data encryption values prior to receiving a request for said data encryption values; and
    a database coupled to said processor for storing said Diffie-Hellman data encryption values; and
    a base station having an RF stage, coupled to said microprocessor, for transmitting said Diffie-Hellman data encryption values to a mobile station.

14. The apparatus according to claim 13, further comprising an encoding block, coupled to said processor, for encrypting data based on an A-Key.

* * * * *